United States Patent
Zou et al.

(10) Patent No.: US 7,660,202 B2
(45) Date of Patent: Feb. 9, 2010

(54) PP/PS EVENT MATCHING (REGISTRATION)

(75) Inventors: Keshan Zou, Missouri City, TX (US);
Jianchun Dai, Houston, TX (US);
Haibin Xu, Missouri City, TX (US);
Andrew E. Hannan, Spring, TX (US);
Adam P. Koesoemadinata, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 486 days.

(21) Appl. No.: 11/247,920

(22) Filed: Oct. 11, 2005

(65) Prior Publication Data

US 2007/0081422 A1   Apr. 12, 2007

(51) Int. Cl.
*G01V 1/24* (2006.01)

(52) U.S. Cl. .................. 367/52; 367/75; 702/17

(58) Field of Classification Search ........... 367/52, 367/75, 38; 702/17–18
See application file for complete search history.

(56) References Cited

U.S. PATENT DOCUMENTS

| | | | |
|---|---|---|---|
| 3,152,314 A | 10/1964 | Mut | |
| 3,208,549 A | 9/1965 | Alexander et al. | |
| 4,422,165 A | 12/1983 | Thomas et al. | |
| 4,611,311 A * | 9/1986 | Frasier | 367/38 |
| 4,635,238 A | 1/1987 | Gallagher et al. | |
| 4,679,174 A | 7/1987 | Gelfand | |
| 4,817,060 A | 3/1989 | Smith | |
| 4,839,869 A * | 6/1989 | Corcoran | 367/53 |
| 4,881,209 A * | 11/1989 | Bloomquist et al. | 367/52 |
| 5,200,928 A * | 4/1993 | MacLeod | 367/27 |
| 5,229,939 A | 7/1993 | Scheibner et al. | |
| 5,781,503 A | 7/1998 | Kim | |
| 6,067,275 A | 5/2000 | Sayers | |
| 6,212,477 B1 * | 4/2001 | Zhu et al. | 702/14 |
| 6,292,754 B1 * | 9/2001 | Thomsen | 702/14 |
| 6,574,563 B1 * | 6/2003 | Nickel | 702/14 |
| 6,611,764 B2 * | 8/2003 | Zhang | 702/18 |
| 6,639,871 B1 | 10/2003 | Garotta et al. | |
| 6,785,612 B1 * | 8/2004 | Zhang | 702/14 |
| 6,807,489 B2 * | 10/2004 | Naville et al. | 702/17 |
| 6,820,010 B1 * | 11/2004 | Sahai et al. | 702/18 |
| 2002/0042702 A1 | 4/2002 | Calvert et al. | |

FOREIGN PATENT DOCUMENTS

WO    WO 2004031805 A1    4/2004

* cited by examiner

*Primary Examiner*—Scott A Hughes
(74) *Attorney, Agent, or Firm*—Ari Pramudji; Liangang (Mark) Ye; Jeffrey E. Griffin

(57) ABSTRACT

A method for generating an average gamma factor for recorded PS data and recorded PP data. The method includes mapping one or more arrival times of the recorded PS data onto one or more expected arrival times of the recorded PP data using an estimated average gamma factor, identifying one or more corresponding pairs of events in the recorded PS data and the recorded PP data using forward modeling, applying geophysical reasoning on the corresponding pairs of events and generating the average gamma factor.

25 Claims, 2 Drawing Sheets

PP/PS EVENT MATCHING (REGISTRATION)

BACKGROUND OF THE INVENTION

1. Field of the Invention

Embodiments of the present invention generally relate to interpreting seismic data, and in particular, to interpreting multi-component seismic data.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

FIG. 1 illustrates a schematic diagram of a typical seismic survey. As commonly known in the art, a seismic survey is generally performed using at least one seismic source 100 and an array of seismic receivers 120, 130 and 140. For land seismic surveying, the seismic source 100 is typically buried beneath the earth's surface and the seismic receivers 120, 130 and 140 are typically disposed on the earth's surface. For marine seismic surveying, the seismic source 100 is typically below the sea water level and the seismic receivers 120, 130 and 140 are typically disposed on the sea floor. When the source 100 is actuated, acoustic (or seismic) energy is emitted downwards into the earth and is reflected by geological interfaces that represent the change of rock elastic properties within the earth. The reflected energy may then be detected at the receivers 120, 130 and 140.

FIG. 1 also illustrates two geological structures 150 and 160 that act as reflectors of acoustic energy. These geological structures 150 and 160 may be formed by contrasting acoustic properties on both sides of the interfaces. As a result, the data acquired at each receiver 120, 130 and 140 contains the responses from one "event" corresponding to a reflection of acoustic energy at the interface 150 and another "event" corresponding to a reflection of acoustic energy at the interface 160.

An event is generally defined as the recorded signals that are associated with a seismic wave recorded by the receiver. Typically these signals are of short duration (tens of milliseconds) compared to the time taken for the seismic wave to travel from the source to the receiver (hundreds of milliseconds to several seconds). So, these signals generally appear as distinct recordings on the seismic data trace. The time of the event would normally be the time of the onset of the signals.

Acoustic energy emitted by the seismic source 100 may predominantly be a pressure-wave (or P-wave). When the acoustic energy undergoes reflection an interface 150, 160, it may also undergo a partial mode conversion to a shear wave (S-wave). As a result, the seismic wavefield acquired at the receivers 120, 130 and 140 may therefore contain both P-waves and S-waves.

Events arising from arrival of P-waves are generally referred to as PP events, since they involve acoustic energy that is emitted as a P-wave and that is recorded on the receiver as a P-wave. Events arising from arrival of S-waves are generally referred to as PS events, since they involve acoustic energy that is emitted as a P-wave but underwent a mode conversion to an S-wave upon reflection and is therefore recorded on the receiver as an S-wave. PP events occur more prominently in vertical components of the acquired seismic data, whereas PS events appear more prominently in the horizontal components of the acquired seismic data.

Where partial mode conversion occurs, the seismic energy reflected as a P-wave gives rise to a PP event in the acquired seismic data and the seismic energy reflected as an S-wave (due to mode conversion) gives rise to a corresponding PS event in the acquired seismic data. Accordingly, a PP event and a PS event are said to be "corresponding events" if the PP event and the PS event involve reflection at the same interface within the earth's interior. The velocity of propagation of a P-wave through the earth generally exceeds the velocity of propagation of an S-wave. As such, a PP event in seismic data acquired at a receiver generally occurs earlier than the corresponding PS event.

When multi-component seismic data is processed, especially at interpretation stage, it is often desirable to identify corresponding pairs of a PP event in PP time and a PS event in PS time. This allows information about the reflector to be obtained from the PP data and from the PS data.

In conventional seismic data processing, raw data traces are first processed to compensate for the source-receiver offset. The effect of this processing is to transfer each event in a trace to the time at which it would have occurred if there had been zero source-receiver offset, i.e., if the source and receiver were coincident. If the correction for offset is performed correctly, an event corresponding to reflection at one interface should occur at the same time in each offset-corrected trace. The traces corrected to zero offset may then be averaged, or "stacked", which is typically applied to PP data and PS data independently in preparation for joint interpretation.

In general, these methods assume that there is a constant linear relationship between the arrival time of a PP event and the arrival time of the corresponding PS event. The arrival time of an event in the PP data may be mapped onto the expected arrival time of the corresponding event in the PS data by multiplying the PP arrival time by a constant factor, known generally as "average gamma". Likewise, the arrival time of an event in the PS data may be mapped onto the expected arrival time of the corresponding event in the PP data by multiplying the PS arrival time with an inverse linear transform of the average gamma. As such, the average gamma factor essentially operates as a squeeze or stretch factor, which is used to stretch or squeeze the vertical axis (time axis) of traces for a vertical component (PP) of the seismic data to the same scale as the vertical axis (time axis) of traces for a horizontal component (PS) of the seismic data.

The magnitude of the average gamma factor may be determined simply by manual identification of pairs of corresponding PP and PS events in the stacked seismic data and derivation of the average gamma factor from their respective arrival times. However, current techniques for generating average gamma factor fails to take into account the difference between PP and PS reflection responses, uncertainty of phases between the post stacked PP data and PS data, and the difference between the frequency of the PP data and the PS data. Accordingly, the average gamma factor determined using current techniques is often inaccurate.

Therefore, a need exists in the art for a new method for generating an average gamma factor.

SUMMARY OF THE INVENTION

Various embodiments of the invention are directed to a method for generating an average gamma factor for recorded PS data and recorded PP data. The method includes mapping one or more arrival times of the recorded PS data onto one or more expected arrival times of the recorded PP data using an estimated average gamma factor, identifying one or more corresponding pairs of events in the recorded PS data and the recorded PP data using forward modeling, applying geophysical reasoning on the corresponding pairs of events and generating the average gamma factor.

In one embodiment, the method further includes matching the frequency of the recorded PP data with the frequency of the recorded PS data prior to identifying the corresponding pairs of events on the recorded PS data and the recorded PP data using forward modeling.

In another embodiment, the estimated average gamma factor is derived from a regional rock physics study.

In yet another embodiment, mapping the arrival times of recorded PS data onto the expected arrival times of recorded PP data includes multiplying the arrival times of the recorded PS data with an inverse linear transform of the estimated average gamma factor.

Various embodiments of the invention are also directed to a method for generating an average gamma factor for recorded PS data and recorded PP data. The method includes mapping one or more arrival times of the recorded PP data onto one or more expected arrival times of the recorded PS data using an estimated average gamma factor, identifying one or more corresponding pairs of events on the recorded PS data and on the recorded PP data using forward modeling, applying geophysical reasoning on the corresponding pairs of events and generating the average gamma factor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
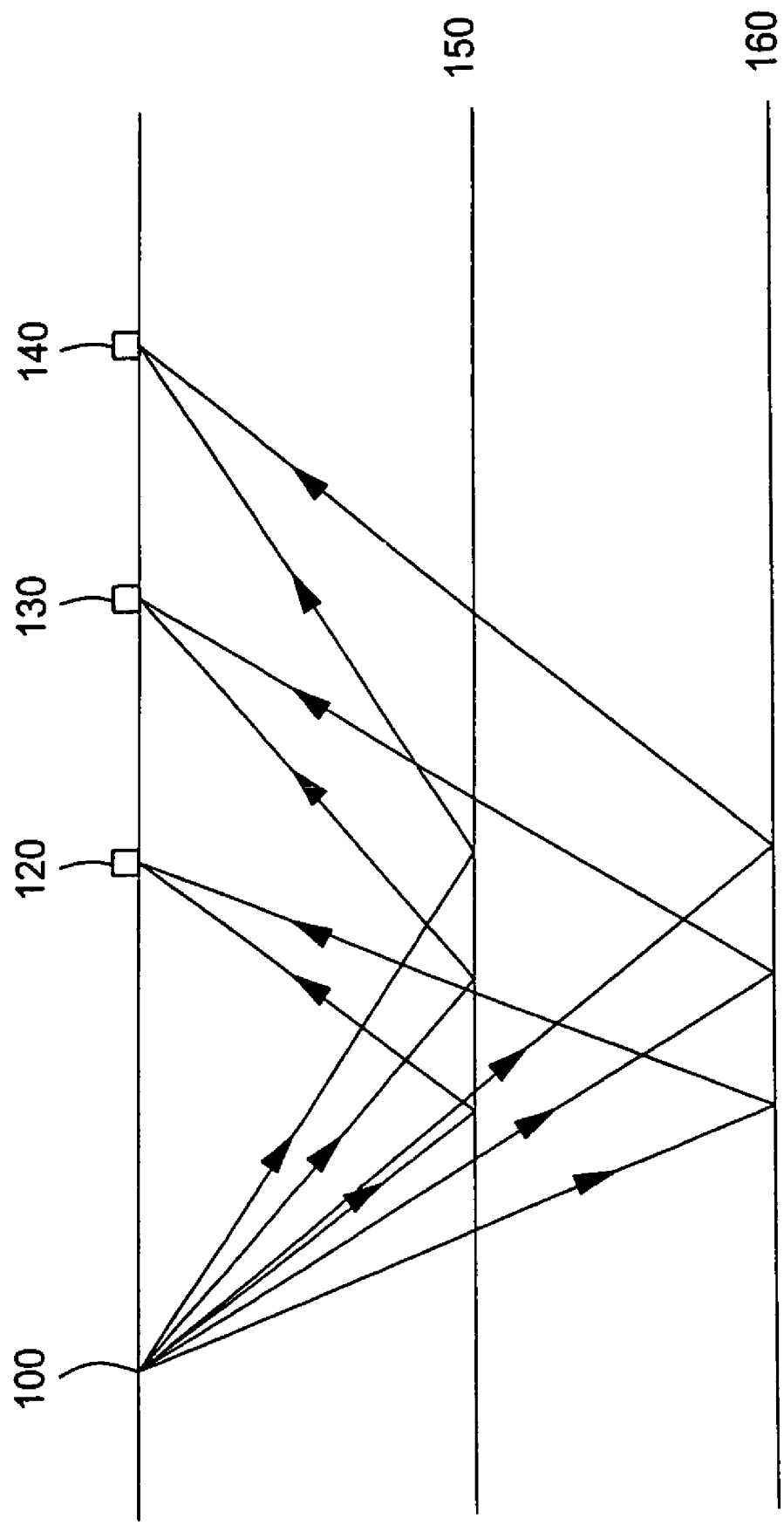
FIG. 1 illustrates a schematic diagram of a typical seismic survey.
Figure 2:
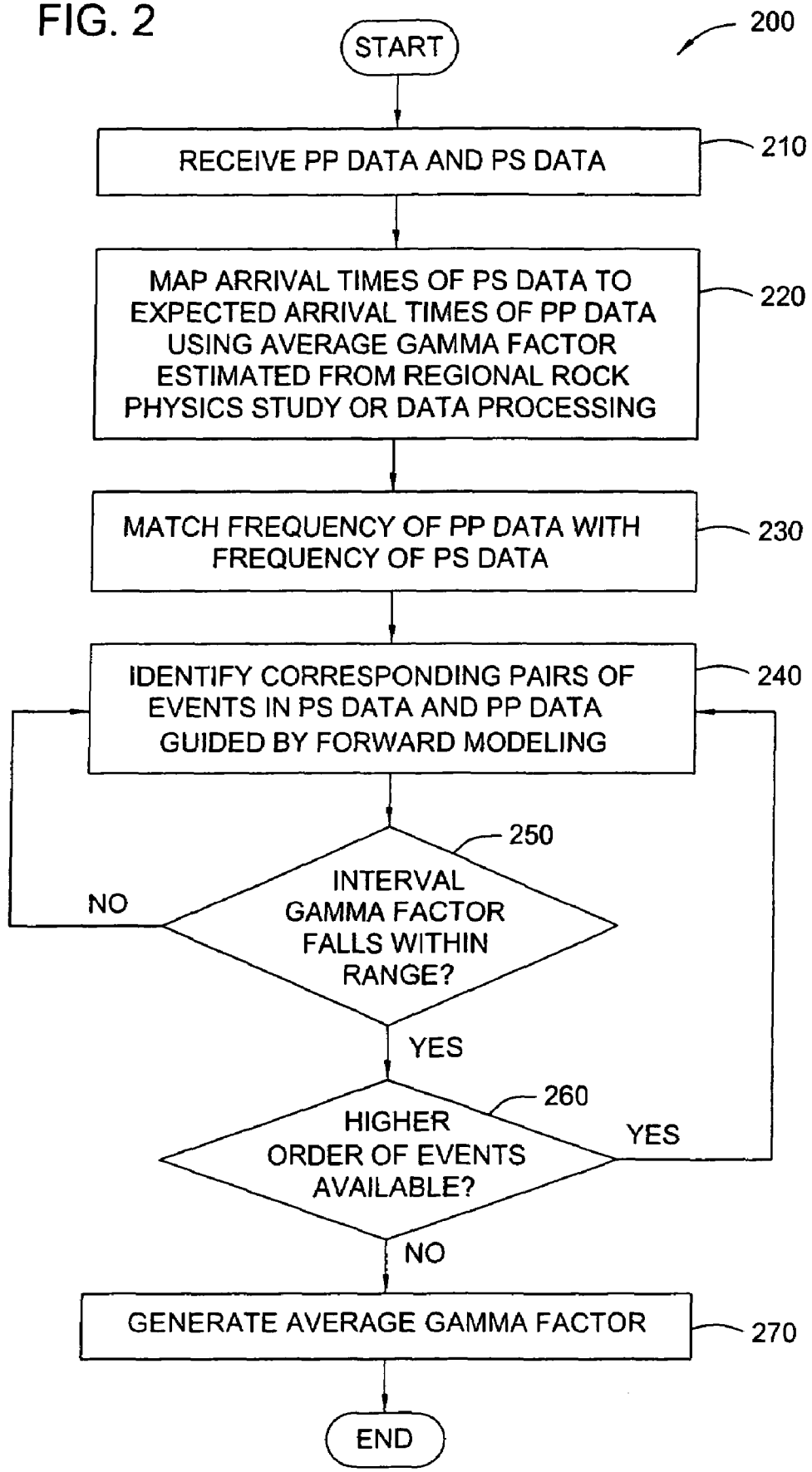
FIG. 2 illustrates a flow diagram of a method for generating an average gamma factor in accordance with one or more embodiments of the invention.

FIG. 2 illustrates a flow diagram of a method 200 for generating an average gamma factor in accordance with one or more embodiments of the invention. The average gamma factor may be defined as the ratio of average P wave velocity (Vp) to average S wave velocity (Vs). As such, the average gamma factor may be commonly referred to as Vp/Vs. Different rock types may have different average gamma factors.

At step 210, a plurality of post-stacked seismic data is received. The plurality of stacked seismic data may be divided into a first section that contains PP data and a second section that contains PS data. The PP data is typically in PP time, while the PS data is typically in PS time. PP time may be defined as the total travel time of a P wave down from a source to a reflection interface and a P wave up from the reflection interface to a receiver. PS time may be defined as the total travel time of a P wave down from the source to a reflection interface and an S wave up from the reflection interface to a receiver.

At step 220, the arrival times of the PS data are mapped onto the expected arrival times of the PP data by multiplying the PS arrival times with an inverse linear transform of the average gamma factor (Vs/Vp), which may be estimated from a regional rock physics study, vertical seismic profile (VSP) or logging data, which may include compression wave velocity and shear wave velocity. The average gamma factor may also be estimated from PP and PS data processing. Alternatively, the arrival times of the PP data may be mapped onto the expected arrival times of the PS data by multiplying the PP arrival times with the average gamma factor. Step 220 is configured to obtain an approximate matching of PP events with PS events.

At step 230, the frequency of the PP data is matched with the frequency of the PS data. The matching operation may be performed using Fourier transform, or any means commonly known by persons of ordinary skill in the art.

At step 240, one or more corresponding pairs of events of PS data and PP data are identified guided by forward modeling. In one embodiment, a set of primary events in the PP data and a set of primary events in the PS data that corresponds with the set of primary events in the PP data are identified. The primary events may be identified using forward modeling based on regional rock physics study, which involves generating synthetic PP data using a P-wave sonic log. The synthetic PP data corresponds with the recorded PP data and may be used as a guide in the selection of events in the recorded PP data. The average gamma factor (Vp/Vs) estimated from the regional rock physics study may be used to calibrate the S-wave sonic log to generate synthetic PS data that corresponds with the recorded PS data. The synthetic PP and PS data may then be correlated with the recorded PP and PS data to mutually match the recorded PP data with the recorded PS data. Although step 240 is performed on post-stacked data, step 240 may additionally be performed on pre-stacked data for cross-validation purposes.

At step 250, a determination is made as to whether an interval gamma factor for the corresponding pairs falls within a predetermined range, such as between about 1.414 and about 8. Step 250 is configured to ascertain whether the interval gamma factor correctly represents the rock property of the earth. The interval gamma factor may be validated with the regional gamma trend, physical gamma bound and local rock property variations. Step 250 may commonly be referred to as geophysical reasoning.

If the interval gamma factor does not fall within the predetermined range, then processing returns to step 240, at which the first set of primary events in the PS data and a second set of primary events in the PP data that corresponds with the first set of primary events in the PS data are identified. Alternatively, the first set of primary events in the PP data and a second set of primary events in the PS data that corresponds with the first set of primary events in the PP data may be identified. Step 240 may commonly be referred to as geological interpretation. Accordingly, subsequent iterations of step 240 may be referred to as updated geological interpretations. In this manner, geophysical reasoning at step 250 may be combined with geological interpretation at step 240 in a loop operation.

If the interval gamma factor falls within the predetermined range, then a determination is made as to whether a higher order of events between the primary events in the PP and PS data is available (step 260). If the answer is in the affirmative, then processing returns to step 240. If the answer is in the negative, then processing continues to step 270, at which an average gamma factor for the PP and PS data is generated. The generated average gamma factor may be used to map the arrival times of events in prestack PS data to the expected arrival times of corresponding events in prestack PP data. Once the arrival times have been mapped, a joint inversion operation may be performed on the prestack PS data and PP data.

While the foregoing is directed to embodiments of the present invention, other and further embodiments of the invention may be devised without departing from the basic scope thereof, and the scope thereof is determined by the claims that follow.

What is claimed is:

1. A method for generating an average gamma factor for recorded PS data and recorded PP data, comprising:
    (a) receiving seismic data containing information about subterranean formations in the earth, wherein the seismic data comprise PS data and PP data and were recorded using one or more seismic receivers during a seismic survey;
    (b) mapping one or more arrival times of the PS data onto one or more expected arrival times of the PP data using an estimated average gamma factor;
    (c) matching the frequency of the PP data with the frequency of the PS data;
    (d) identifying one or more corresponding pairs of events in the PS data and the PP data using forward modeling;
    (e) applying geophysical reasoning on the corresponding pairs of events; and
    (f) generating the average gamma factor, wherein the average gamma factor is a ratio of an average P wave velocity to an average S wave velocity, and wherein the average gamma factor represents the structure of the subterranean formations.

2. The method of claim 1, further comprising receiving a plurality of post-stacked seismic data.

3. The method of claim 1, further comprising receiving a first section of PP data and a second section of PS data.

4. The method of claim 3, wherein the PP data is in PP time.

5. The method of claim 3, wherein the PS data is in PS time.

6. The method of claim 1, wherein mapping the arrival times of PS data onto the expected arrival times of PP data comprises multiplying the arrival times of the PS data with an inverse linear transform of the estimated average gamma factor.

7. The method of claim 1, wherein the estimated average gamma factor is derived from a regional rock physics study.

8. The method of claim 1, wherein the estimated average gamma factor is derived from logging data.

9. The method of claim 1, wherein the estimated average gamma factor is derived from vertical seismic profile data.

10. The method of claim 1, wherein identifying the corresponding pairs of events in the PS data and the PP data using forward modeling comprises identifying a set of primary events in the PP data and a set of primary events in the PS data that corresponds with the set of primary events in the PP data.

11. The method of claim 1, wherein the forward modeling is based on regional rock physics study.

12. The method of claim 1, wherein identifying the corresponding pairs of events in the PS data and the PP data using forward modeling comprises generating synthetic PP data using a P-wave sonic log, wherein the synthetic PP data corresponds with the PP data.

13. The method of claim 12, further comprising using the synthetic PP data as a guide in identifying the corresponding pairs of events in the PS data and the PP data.

14. The method of claim 1, wherein identifying the corresponding pairs of events in the PS data and the PP data using forward modeling comprises generating synthetic PS data using an S-wave sonic log, wherein the synthetic PS data corresponds with the PS data.

15. The method of claim 14, further comprising using the synthetic PS data as a guide in identifying the corresponding pairs of events in the PS data and the PP data.

16. The method of claim 1, wherein applying geophysical reasoning on the corresponding pairs of events comprises determining whether an interval gamma factor for the corresponding pairs of events falls within a predetermined range of values.

17. The method of claim 16, wherein the predetermined range is from about 1.414 to about 8.

18. The method of claim 16, wherein applying the geophysical reasoning on the corresponding pairs of events further comprises: if the interval gamma factor for the corresponding pairs of events does not fall within the predetermined range, then returning to step (d).

19. The method of claim 16, wherein identifying the corresponding pairs of events in the PS data and the PP data using forward modeling comprises identifying a set of primary events in the PP data and a set of primary events in the recorded PS data that corresponds with the set of primary events in the PP data; and wherein applying the geophysical reasoning on the corresponding pairs of events further comprises:
    if the interval gamma factor for the corresponding pairs of events falls within the predetermined range, then determining whether a higher order of events between the primary events in the PP data and in the PS data is available; and
    if the higher order is available, then repeating step (d).

20. A method for generating an average gamma factor for recorded PS data and recorded PP data, comprising:
    receiving seismic data containing information about subterranean formations in the earth, wherein the seismic data comprise PS data and PP data and were recorded using one or more seismic receivers during a seismic survey;
    mapping one or more arrival times of the PP data onto one or more expected arrival times of the PS data using an estimated average gamma factor;
    matching the frequency of the PP data with the frequency of the PS data;
    identifying one or more corresponding pairs of events on the PS data and on the PP data using forward modeling;
    applying geophysical reasoning on the corresponding pairs of events; and
    generating the average gamma factor, wherein the average gamma factor is a ratio of an average P wave velocity to an average S wave velocity, and wherein the average gamma factor represents the structure of subterranean formations in the earth.

21. The method of claim 1, further comprising using the average gamma factor to map one or more arrival times of events in pre-stacked PS data to one or more expected arrival times of corresponding events in pre-stacked PP data.

22. The method of claim 21, further comprising performing a joint inversion on the pre-stacked PS data and PP data.

23. The method of claim 20, wherein the forward modeling is based on regional rock physics study.

24. The method of claim 20, further comprising receiving a first section of PP data and a second section of PS data.

25. The method of claim 20, wherein the estimated average gamma factor is derived from a regional rock physics study.

* * * * *